(12) United States Patent
Onodera et al.

(10) Patent No.: US 9,168,603 B2
(45) Date of Patent: Oct. 27, 2015

(54) WIRE ELECTRIC DISCHARGE MACHINING APPARATUS

(75) Inventors: Yasuo Onodera, Tokyo (JP); Takahiro Shiozawa, Tokyo (JP); Tatsushi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 763 days.

(21) Appl. No.: 13/382,425

(22) PCT Filed: Jul. 7, 2009

(86) PCT No.: PCT/JP2009/003143
§ 371 (c)(1),
(2), (4) Date: Jan. 5, 2012

(87) PCT Pub. No.: WO2011/004426
PCT Pub. Date: Jan. 13, 2011

(65) Prior Publication Data
US 2012/0103943 A1     May 3, 2012

(51) Int. Cl.
*B23H 7/10*  (2006.01)
*B23H 7/06*  (2006.01)
(Continued)

(52) U.S. Cl.
CPC .................. *B23H 7/065* (2013.01); *B23H 7/04* (2013.01); *B23H 7/20* (2013.01)

(58) Field of Classification Search
CPC ............ B23H 7/04; B23H 7/20; B23H 7/065; B23H 1/00; B23H 7/02
USPC ............. 219/69.12, 69.13, 69.17, 69.18, 69.2
See application file for complete search history.

(56) References Cited

U.S. PATENT DOCUMENTS 2,927,191 A * 3/1960 Matulaitis .................. 219/69.16
3,120,619 A * 2/1964 Webb ............................ 327/574
(Continued)

FOREIGN PATENT DOCUMENTS

JP    59-146718 A    8/1984
JP    61-95824 A    5/1986
(Continued)

OTHER PUBLICATIONS

International Search Report (PCT/ISA/210) issued on Oct. 6, 2009 in the International Patent Application No. PCT/JP2009/003143.
(Continued)

*Primary Examiner* — Dana Ross
*Assistant Examiner* — Renee L Miller
(74) *Attorney, Agent, or Firm* — Sughrue Mion, PLLC; Richard C. Turner

(57) ABSTRACT

A wire electric discharge machining apparatus that performs an electric discharge machining by applying a pulse voltage between a wire electrode (1) and a workpiece (2), the wire electric discharge machining apparatus including, a machining speed detection unit (14) that detects relative machining speed of the workpiece (2) and the wire electrode (1); a machining energy calculation unit (13) that calculates machining energy of a discharge pulse; a board thickness calculation unit (12) that calculates a board thickness of the workpiece (4) based on the machining speed detected by the machining speed detection unit (14) and the machining energy calculated by the machining energy calculation unit (13); a stationary state determination unit (16) that determines whether the machining is in a stationary state from a machining state during the machining, after the machining condition is switched in accordance with a board thickness of the workpiece (4) calculated by the board thickness calculation unit (12); and a machining condition switching unit (11) that switches the machining condition to a machining condition corresponding to a board thickness calculated by the board thickness calculation unit (12) when the stationary state determination unit (16) determines that the machining is in the stationary state and does not switch the machining condition to the machining condition corresponding to a calculated board thickness when the stationary state determination unit determines that the machining is not in the stationary state.

11 Claims, 5 Drawing Sheets

(51) Int. Cl.
*B23H 7/04* (2006.01)
*B23H 7/20* (2006.01)

(56) References Cited

U.S. PATENT DOCUMENTS

| | | | | |
|---|---|---|---|---|
| 3,257,580 | A * | 6/1966 | Webb | 315/127 |
| 3,816,692 | A * | 6/1974 | Ratmansky | 219/69.13 |
| 4,104,502 | A * | 8/1978 | Ullmann et al. | 219/69.12 |
| 4,262,185 | A * | 4/1981 | Delpretti | 219/69.12 |
| 4,320,280 | A * | 3/1982 | Inoue | 219/69.12 |
| 4,427,871 | A * | 1/1984 | Drushel et al. | 219/69.18 |
| 4,443,681 | A * | 4/1984 | Drushel | 219/69.13 |
| 4,447,696 | A * | 5/1984 | Niwa | 219/69.18 |
| 4,773,030 | A * | 9/1988 | Delpretti | 700/162 |
| 4,798,929 | A * | 1/1989 | Itoh | 219/69.12 |
| 4,894,504 | A * | 1/1990 | Truty | 219/69.12 |
| 4,970,363 | A * | 11/1990 | Obara | 219/69.12 |
| 5,233,147 | A * | 8/1993 | Magara | 219/69.12 |
| 5,243,166 | A * | 9/1993 | Nakayama | 219/69.12 |
| 5,306,888 | A * | 4/1994 | Kaneko et al. | 219/69.12 |
| 5,459,674 | A * | 10/1995 | Ide et al. | 703/1 |
| 5,464,959 | A * | 11/1995 | Takahashi | 219/69.14 |
| 5,500,500 | A * | 3/1996 | Mohri et al. | 219/69.17 |
| 5,539,172 | A * | 7/1996 | Takase et al. | 219/69.2 |
| 5,756,956 | A * | 5/1998 | Sato et al. | 219/69.18 |
| 5,808,263 | A * | 9/1998 | Beltrami | 219/69.12 |
| 5,824,986 | A * | 10/1998 | Derighetti et al. | 219/69.12 |
| 5,894,418 | A * | 4/1999 | Sato et al. | 700/173 |
| 6,252,191 | B1 * | 6/2001 | D'Amario | 219/69.13 |
| 6,320,151 | B1 * | 11/2001 | Angelella et al. | 219/69.12 |
| 6,396,021 | B1 * | 5/2002 | Sato et al. | 219/69.12 |
| 6,600,125 | B1 * | 7/2003 | Boccadoro et al. | 219/69.17 |
| 6,621,033 | B2 * | 9/2003 | Sato et al. | 219/69.15 |
| 6,723,941 | B2 * | 4/2004 | Sato et al. | 219/69.12 |
| 6,788,019 | B2 * | 9/2004 | Imai et al. | 318/570 |
| 6,930,273 | B2 * | 8/2005 | Nakashima et al. | 219/69.13 |
| 7,019,246 | B2 * | 3/2006 | Kurihara et al. | 219/69.12 |
| 7,259,347 | B2 * | 8/2007 | Sasaki et al. | 219/69.13 |
| 7,268,314 | B2 * | 9/2007 | Satou et al. | 219/69.18 |
| 7,371,989 | B2 * | 5/2008 | Miyajima et al. | 219/69.12 |
| 7,892,410 | B2 * | 2/2011 | Goto et al. | 205/83 |
| 2003/0098293 | A1 * | 5/2003 | Sato et al. | 219/69.12 |
| 2003/0098294 | A1 * | 5/2003 | Goto et al. | 219/69.12 |
| 2005/0127041 | A1 * | 6/2005 | Kobayashi et al. | 219/69.13 |
| 2005/0263493 | A1 * | 12/2005 | Kurihara et al. | 219/69.12 |
| 2005/0269296 | A1 * | 12/2005 | Arakawa et al. | 219/69.12 |
| 2006/0054600 | A1 * | 3/2006 | Satou et al. | 219/69.18 |
| 2006/0091113 | A1 * | 5/2006 | Hiraga et al. | 219/69.12 |
| 2007/0119821 | A1 * | 5/2007 | Kaneko | 219/69.12 |
| 2008/0015729 | A1 * | 1/2008 | Lin | 700/162 |
| 2008/0047937 | A1 * | 2/2008 | Giandomenico et al. | 219/69.13 |
| 2008/0110865 | A1 * | 5/2008 | Hashimoto et al. | 219/69.12 |

FOREIGN PATENT DOCUMENTS

| | | | |
|---|---|---|---|
| JP | 61095824 A | * | 5/1986 |
| JP | 63-207516 A | | 8/1988 |
| JP | 10-29117 A | | 2/1998 |
| JP | H1029117 A | * | 2/1998 |
| WO | WO 7900380 A | * | 6/1979 |

OTHER PUBLICATIONS

Written Opinion (PCT/ISA/237) issued on Oct. 6, 2009 in the International Patent Application No. PCT/JP2009/003143.

* cited by examiner

WIRE ELECTRIC DISCHARGE MACHINING APPARATUS

TECHNICAL FIELD

The present invention relates to a wire electric discharge machining apparatus.

BACKGROUND ART

In general, in a wire electric discharge machining, when a board thickness of a workpiece is within a range of 40 to 60 mm, a wire breaking limit of a wire electrode is the highest, so that it is possible to set a machining condition having the highest machining energy.

This is because, although there is a limit on the machining current to be supplied to the wire electrode, as the workpiece becomes thicker, a current density per a unit wire electrode length becomes smaller, so that the wire breaking limit is increased. In the meantime, when the board thickness exceeds a threshold value, the effects of removing machining powders and cooling the wire electrode by a machining liquid are deteriorated, so that the wire breaking limit is lowered and thus the wire may be broken down.

In other words, as described above, the inputtable energy becomes maximum when the board thickness is within the range of 40 to 60 mm, and decreases as the board thickness becomes more distant from the range.

In machining the workpiece having different board thickness with a wire electric discharge machining apparatus, when the machining condition is set in correspondence to a board thickness portion having a high wire breaking limit, the wire breaks down when machining a board thickness portion having a low wire breaking limit, and when the machining condition is set in correspondence to a board thickness portion having a low wire breaking limit, the machining speed is lowered when machining a board thickness portion having a high wire breaking limit.

Accordingly, in order to efficiently machine the workpiece without the wire breaking by the wire electric discharge machining apparatus, it is necessary to set an appropriate machining condition in accordance with the change of the board thickness of the workpiece. Patent Document 1 discloses a technology of obtaining a board thickness of a workpiece by calculating a ratio of machining speed and machining energy and selecting appropriate machining conditions in accordance with the calculated board thickness, thereby efficiently performing an electric discharge machining.

RELATED ART DOCUMENT

Patent Document

Patent Document 1: JP H10-29117A

SUMMARY OF THE INVENTION

Problems that the Invention is to Solve

According to the change of the machining condition disclosed in Patent Document 1, the machining condition is changed by calculating the board thickness from the ratio of the machining feed rate and the machining energy.

Specifically, in the electric discharge machining, a machining volume per unit time is calculated by multiplication of a board thickness of an workpiece, a machining allowance value and a machining feed rate per unit time (refer to expression 1).

Board thickness=Machining volume/(Machining feed rate×Machining allowance value)    [Expression 1]

Since the machining volume is proportional to the machining energy, the expression 1 can be expressed by expression 2.

Board thickness=(Integer×Machining energy)/(Machining feed rate×Machining allowance value)    [Expression 2]

For example, when performing the machining in a direction toward a board thickness having a high wire breaking limit (i.e., thick) from a board thickness having a low wire breaking limit (i.e., thin), the change of the board thickness is detected on the basis of the expression 2 and the machining condition is switched to the machining condition having high preset machining energy in accordance with the detected board thickness.

Just after the machining condition is changed (during a transient state corresponding to responsiveness of a machining servo), the machining is not stable due to the change of the machining energy, so that a roughness of a machining surface may be deteriorated and the wire may be broken.

By experiments, the inventors of the invention found that the problems occurred just after the machining condition is changed in correspondence to the change of the board thickness is due to the change of the machining allowance value.

That is, when the machining is switched from the thin board thickness to the thick board thickness, the machining allowance value increases due to the machining energy after the change. On the contrary, when the machining is switched from the thick board thickness to the thin board thickness, the machining allowance value decreases after there is a switching to the machining condition of a low machining energy. In view of machining precision, the control (machining servo) is performed so that the machining allowance value is constant. Nevertheless, since the response of the machining servo is actually slower than a condition switching of a machining power supply, the machining allowance value is not constant just after the machining condition is changed.

Specifically, rather than the machining allowance value being increased by the machining energy after the change, the machining allowance value is increased (or decreased) because, even though the machining energy is changed, the machining speed is not immediately changed to the machining speed corresponding to the machining energy due to the response of the machining servo being slow.

Although the board thickness for determining the machining energy is determined based on the expression 2, which is described above, in the transient state after the change of the board thickness, the machining allowance value changes. Accordingly, when the board thickness is falsely detected due to the change of the machining allowance value in the expression 2 and thus the machining condition is changed in accordance with the falsely detected board thickness, the machining condition is resultantly switched to an inappropriate machining condition or switched to a machining condition of a higher energy than the appropriate machining condition. As a result, the wire breaking may be caused.

In addition, since the machining may be unstably performed at an end surface and a corner portion, the board thickness may be falsely detected, so a problem similar to that described above may be caused.

That is, the inventors clarified that even by merely switching the machining condition in accordance with the board thickness calculated by the expression 2, the machining condition is not switched to the appropriate machining condition or are switched to the inappropriate machining condition, there by causing the wire breaking.

The invention has been made to solve the above problem. An object of the invention is, since a false detection may be caused in a transient state just after the machining condition is switched in accordance with a change of a board thickness, to prevent the false detection of the change of the board thickness and to provide a machining condition corresponding to an actual board thickness so as to perform the machining with high precision.

Means for Solving the Problem

In order to achieve the above object, according to the invention, there is provided a wire electric discharge machining apparatus that performs an electric discharge machining to a workpiece by applying a pulse voltage between a wire electrode and the workpiece, thereby generating a discharge pulse, in accordance with a machining condition which is set, the wire electric discharge machining apparatus including: a machining speed detection unit that detects relative machining speed of the workpiece and the wire electrode; a machining energy calculation unit that calculates machining energy of the discharge pulse; a board thickness calculation unit that calculates a board thickness of the workpiece based on the machining speed detected by the machining speed detection unit and the machining energy calculated by the machining energy calculation unit; a stationary state determination unit that determines whether the machining is in a stationary state from a machining state during the machining, after the machining condition is switched in accordance with a board thickness of the workpiece calculated by the board thickness calculation unit; and a machining condition switching unit that switches the machining condition to a machining condition corresponding to a board thickness calculated by the board thickness calculation unit when the stationary state determination unit determines that the machining is in the stationary state and does not switch the machining condition to the machining condition corresponding to a calculated board thickness when the stationary state determination unit determines that the machining is not in the stationary state.

Advantage of the Invention

According to the invention, the stationary state determination unit can determine a transient state of the machining servo in which the board thickness may be falsely detected and a stationary state of the machining servo in which the board thickness can be precisely calculated.

At the transient state in which the board thickness may be falsely detected, the apparatus waits for the switching of the machining condition corresponding to the calculated board thickness and switches the machining condition in accordance with the calculated board thickness after the board thickness can be precisely calculated at the stationary state. As a result, it is possible to avoid the switching to the inappropriate machining condition due to the false detection of the board thickness.

MODE FOR CARRYING OUT THE INVENTION

Figure 1:
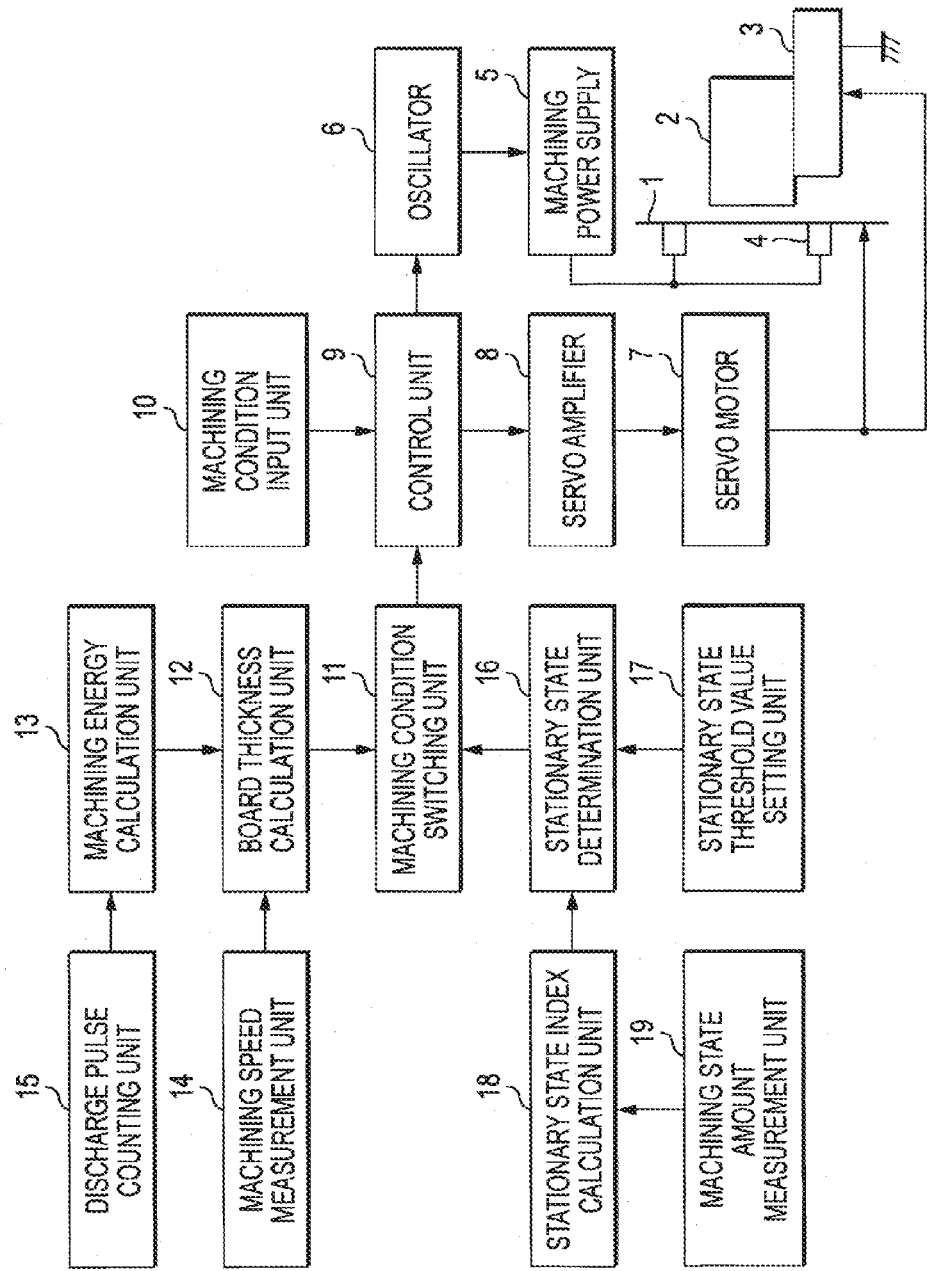
FIG. 1 is a block diagram showing a configuration of a wire electric discharge machining apparatus according to a first embodiment.

FIG. 1 is a block diagram showing an overall configuration of a wire electric discharge machining apparatus according to a first embodiment.

The apparatus has a wire electrode 1, a pair of power feeders 4 contacting the wire electrode 1, a machining power supply 5 that applies a pulse voltage to the power feeders 4 in accordance with an output of an oscillator 6, a servo motor 7 that moves the wire electrode 1 and a workpiece table 3 on which a workpiece is mounted, a servo amplifier 8 that drives the servo motor 7, a control unit 9 that controls the oscillator 6 and the servo amplifier 8 and a machining condition input unit 10 that sets a machining condition.

The apparatus generates an electric discharge between the wire electrode 1 and the workpiece 2 to perform the machining while relatively moving the wire electrode 1 and the workpiece 2 at predetermined speed.

Further, the wire electric discharge machining apparatus of the invention has a discharge pulse counting unit 15 that counts the number of all discharge pulses generated at a machining gap in a predetermined sampling period, a machining energy calculation unit 13 that calculates machining energy from the number of discharge pulses output by the discharge pulse counting unit 15, a machining speed measurement unit 14 that measures machining speed that is a machining feed rate per unit time, and a board thickness calculation unit 12 that calculates a board thickness of the workpiece 2 from the machining energy output by the machining energy calculation unit 13 and the machining speed output by the machining speed measurement unit 14.

Also, the apparatus has a machining state amount measurement unit 19 that measures a machining state amount, a stationary state index calculation unit 18 that calculates a stationary state index of a control based on an inter-electrode voltage between the wire electrode and the workpiece from the machining state amount output by the machining state amount measurement unit 19, a stationary state threshold value setting unit 17 that sets a threshold value for determining whether a machining servo is in a stationary state and a stationary state determination unit 16 that compares the stationary state index output by the stationary state index calculation unit 18 and the stationary state threshold value set by the stationary state threshold value setting unit 17 to determine whether the machining servo is in the stationary state.

The apparatus also has a machining condition switching unit 11 that switches the machining condition, based on the board thickness of the workpiece 2 calculated by the board thickness calculation unit 12 and a stationary state determination result output by the stationary state determination unit 16.

In this embodiment, the control device 9 to the machining state amount measurement unit 19 are configured as respective functions of a numerical control apparatus.

Before explaining the operations of the first embodiment, a principle of the invention is described.

As described in the related art, in order to efficiently machine an workpiece having a plurality of different board thickness without the wire breaking by the wire electric discharge machining apparatus, it is necessary to appropriately switch the machining condition in accordance with the board thickness of the workpiece.

Accordingly, the discharge pulse counting unit 15 counts the number of all discharge pulses generated at a machining gap in a predetermined sampling period (unit time) and the machining energy calculation unit 13 calculates the machining energy from multiplication of the number of discharge pulses output from the discharge pulse counting unit 15 and a peak value of electric discharge current.

Also, the machining speed measurement unit 14 measures a machining feed rate per unit time by using a linear scale and the like and sets the machining feed rate per unit time as machining speed.

The machining allowance value is constant when performing the machining by applying the machining servo. Accordingly, when the machining allowance value is obtained in advance, it is possible to calculate the board thickness from the machining energy and the machining speed by using the expression 2.

Then, the board thickness calculation unit 12 calculates the board thickness of the workpiece 2 from the machining energy output by the machining energy calculation unit 13 and the machining speed output by the machining speed measurement unit 14 by using the expression 2, the machining condition switching unit 11 instructing the NC apparatus 9 such that the machining condition corresponds to the calculated board thickness, and machining is performed.

In the meantime, as described in the related art, at the transient state just after the machining condition is switched to the machining condition having the high machining energy, the machining allowance value is increased compared to the stationary state. On the contrary, at the transient state just after the machining condition is switched to the machining condition having the low machining energy, the machining allowance value is decreased compared to the stationary state. Accordingly, from the expression 2, when the machining allowance value is increased at the transient state, compared to the stationary state, the board thickness is calculated to be thinner than the actual board thickness and when the machining allowance value is decreased at the transient state, compared to the stationary state, the board thickness is calculated to be thicker than the actual board thickness.

Figure 2:
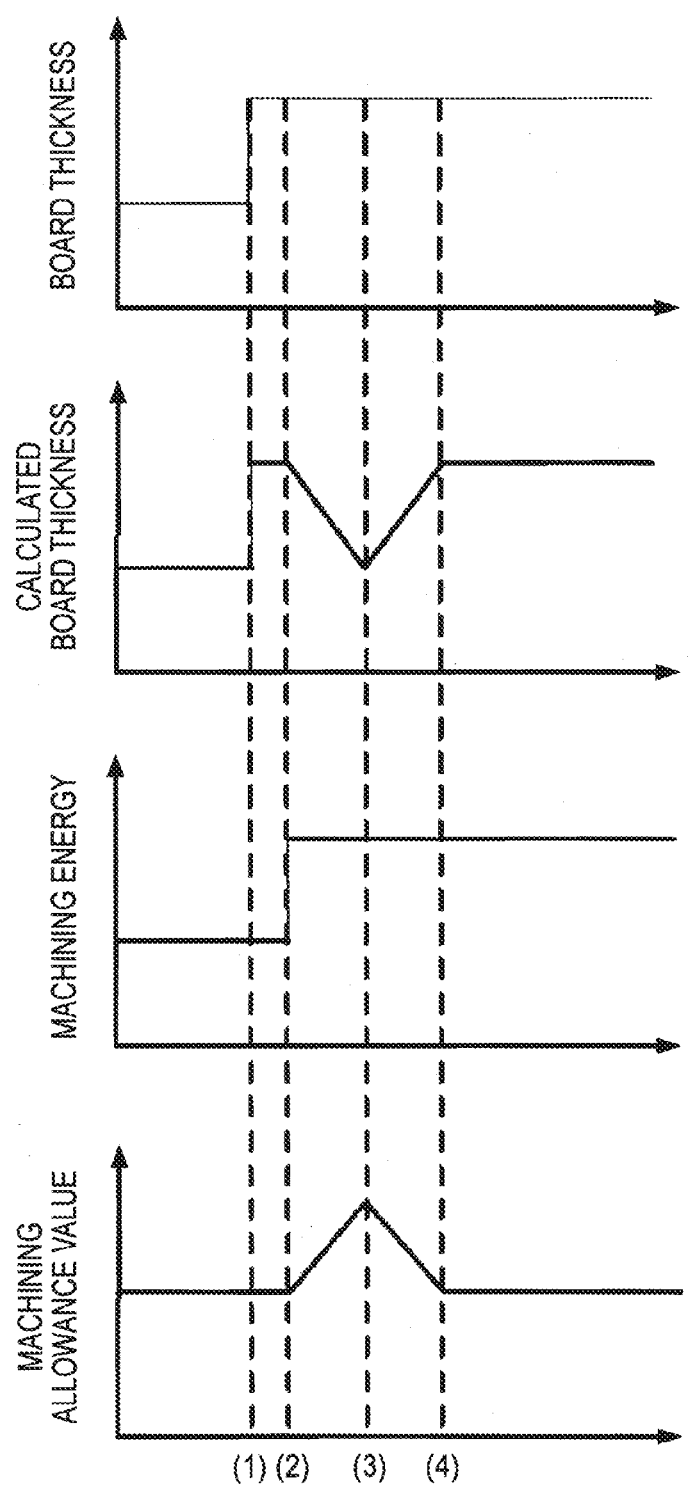
FIG. 2 is a view for explaining a cause of board thickness detection when a machining condition is switched in the first embodiment.

FIG. 2 shows the calculated board thickness, machining energy and machining allowance value when the machining is performed toward the board thickness having a high wire breaking limit from the board thickness having a low wire breaking limit. At timing 1, the board thickness changes and the calculated board thickness also highly changes.

Hence, after a predetermined time lag, the machining energy is switched to the machining condition corresponding to the change of the calculated board thickness and is thus increased.

In the meantime, the time lag between the board thickness calculation at the timing 1 and the machining energy change is caused due to a delay after the control unit 9 outputs the condition switching until the machining power supply 5 operates at the conditions of the switching output. However, the delay time is only several tens to several hundreds of micro seconds and hardly affects the machining.

At the transient state after the machining condition switching, as described above, the machining allowance value is not constant, and between timings 2 and 4, the machining allowance value is increased, compared to that in the stationary state, so that the board thickness is calculated to be thinner than the actual board thickness and the machining condition may not be switched to the appropriate machining condition even by switching the machining condition in accordance with the calculated board thickness.

In the meantime, after timing 4, at which the transient state has passed, the machining allowance value becomes constant and the board thickness is precisely calculated.

In other words, the invention is to perform the machining at the machining condition corresponding to an accurate board thickness without switching the machining condition corresponding to the calculated board thickness, at the transient state (the periods from timing 2 to timing 4) just after the machining condition is switched or when the machining is unstable.

In the meantime, the invention pays attention to the response of the machining servo, which is closely related to the machining allowance value. That is, at the transient state or unstable state in which the board thickness may be falsely detected, the unstable state of the machining servo is considered as a state in which the machining servo is not settled to the stationary state, and the change of the machining condition when the board thickness is changed is controlled by detecting whether the machining servo is settled to the stationary state.

In the below, it is described that the unstable state of the machining servo is also included in the transient state of the machining servo.

Figure 3:
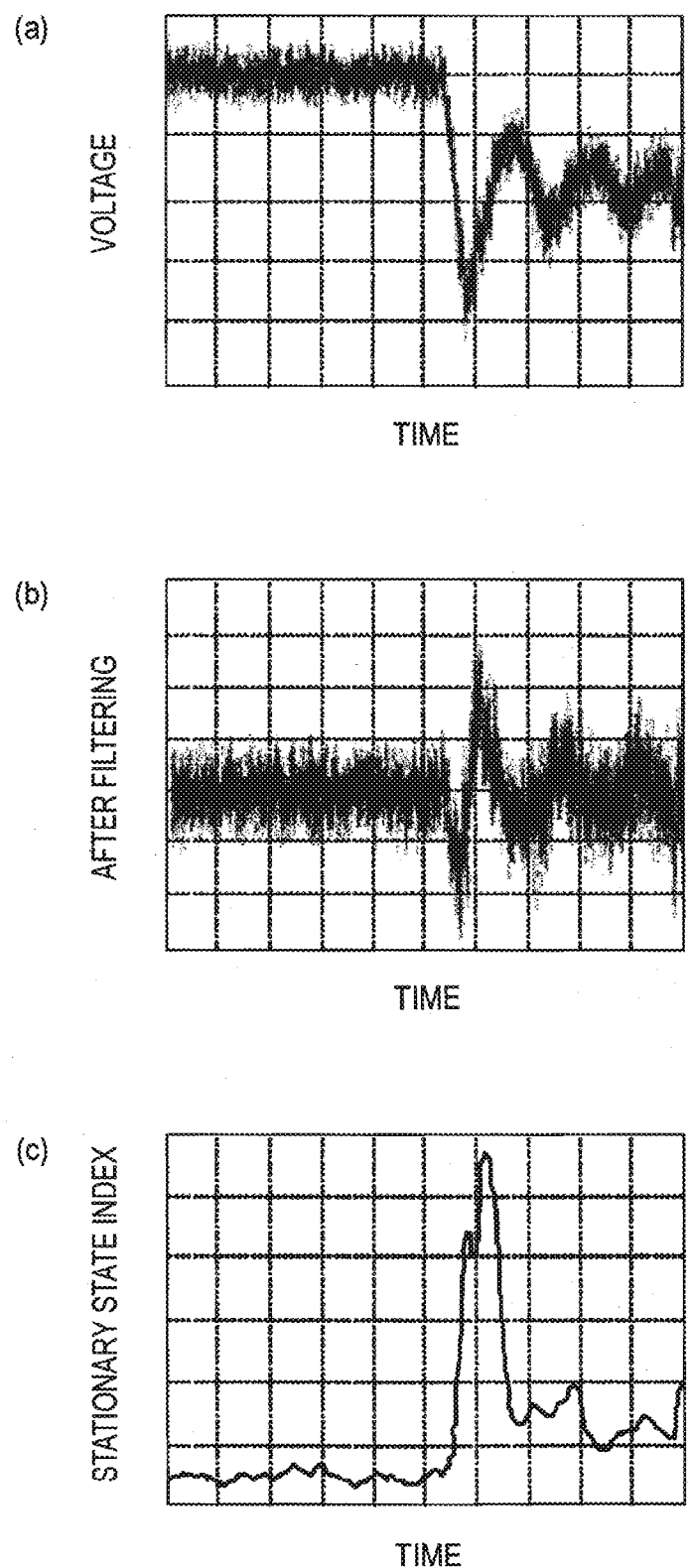
FIG. 3 is a view showing a calculation process of a stationary state index.

FIG. 3 shows a process of calculating a stationary state index of the machining servo from an inter-electrode voltage, in which FIG. 3(a) shows an inter-electrode voltage waveform, FIG. 3(b) shows a waveform that is high pass filtered so as to extract only AC components from the waveform of FIG. 3(a) and FIG. 3(c) shows a waveform that is low pass filtered after taking absolute values of the waveform shown in FIG. 3(b).

When the machining condition is switched from the machining condition of low machining energy to the machining condition of high machining energy as the board thickness is changed, it takes time until the inter-electrode voltage becomes stable under stationary state, as shown in FIG. 3(a).

As described above, while the inter-electrode voltage varies, it means that it is the transient state of the machining servo and it is not possible to accurately calculate a board thickness.

Thus, by obtaining the variation amount of the inter-electrode voltage by a high pass filter for extracting the AC components only, taking the absolute values of the waveform and performing the low pass filtering thereto, thereby removing the high frequency noise and obtaining the waveform shown in FIG. 3(c), and determining whether the machining servo is in the transient state by setting a predetermined threshold value, it is possible to use the waveform of FIG. 3(c) as a stationary state index of the machining servo.

The threshold value is obtained by performing the machining while obtaining a stationary state index value and calculating a board thickness, and by examining a stationary state index value during the false detection of the board thickness in advance.

The above is an example of the stationary state index. That is, in addition to the inter-electrode voltage, the stationary state index may be calculated from any one of the number of discharge pulses, the servo command speed and the machining speed.

In addition, the process of calculating the stationary state index from the machining state amount such as inter-electrode voltage is also not limited to the above described procedure. For example, moving average deviations or variance values may be used as the stationary state index.

Regarding the timing of starting the determination of the stationary state, when the determination of the stationary state is immediately performed after the switching of the machining condition, it will be determined that the machining servo is in the stationary state before the stationary state index is changed.

This is because the response of the stationary state index is substantially same as the relatively slow response of the machining servo.

Accordingly, it is necessary to determine whether the machining servo is in the stationary state after waiting for a time considering the response of the stationary state index.

As described above, it is determined whether the machining servo is in the stationary state. While it is determined that the machining servo is in the transient state, the apparatus holds the switching of the machining condition corresponding to the calculated board thickness. After it is determined that the machining servo is in the stationary state and it is thus possible to accurately calculate the board thickness, it is switched to the machining condition corresponding to the calculated board thickness. Therefore, it is possible to avoid the switching to the inappropriate machining condition due to the false detection of the board thickness.

Next, the operation of the first embodiment is described with reference to FIGS. 1 and 4.

Figure 4:
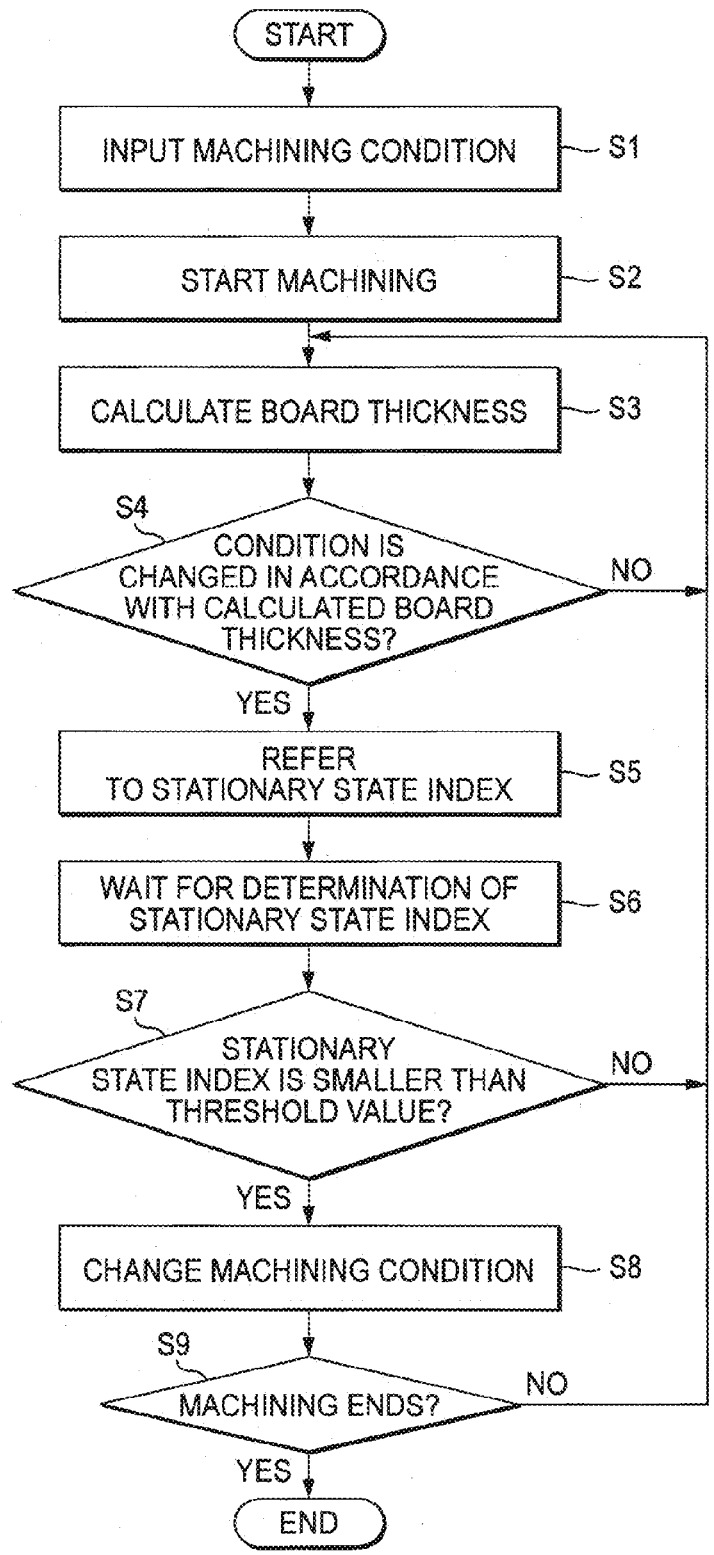
FIG. 4 is a flowchart showing a machining condition switching control operation of the first embodiment.

FIG. 4 is a flowchart showing a control operation of switching the machining condition.

As shown in FIG. 1, the machining condition is input to the control unit 9 from the machining condition input unit 10 before the machining is started. In general, the machining condition is provided by a machine maker of the electric discharge machining apparatus. However, a user may make the machining condition and input the same in the machining condition input unit 10.

The wire electrode 1 is traveled by a wire electrode traveling unit (not shown), the control unit 9 transmits the input machining condition to the oscillator 6 and the machining power supply 5 applies the pulse voltage between the wire electrode 1 and the workpiece 2 through the power feeders 4 in accordance with an oscillation command of the oscillator 6, thereby performing the electric discharge machining.

In addition, the servo amplifier 8 drives the servo motor 7 in accordance with a machining speed command output from the control unit 9 and the servo motor 7 moves the workpiece table so that the wire electrode 1 and the workpiece 2 are relatively moved.

The control unit 9 issues a command in accordance with the machining condition input to the machining condition input unit 10. On the other hand, the control unit 9 switches the machining condition in accordance with the command by the machining condition switching unit 11.

The detailed operations of the machining condition switching unit 11 are described with reference to FIG. 4.

As shown in FIG. 4, a user inputs the machining condition to the machining condition input unit 10 before the machining is started (step S1). The condition may be input to the machining condition input unit 10 beforehand by a maker.

When the user starts the machining, the numerical control device 9 performs the machining in accordance with the input machining condition (step S2).

When the machining is started, the discharge pulse counting unit 15 counts the number of discharge pulses and transmits the counted number of discharge pulses to the machining energy calculation unit 13 in real time.

The machining energy calculation unit 13 multiplies the number of discharge pulses by a peak value of the electric discharge current to calculate the machining energy and transmits the same to the board thickness calculation unit 12.

Also, the machining speed measurement unit 14 sets the machining feed rate per unit time, which is measured by using a linear scale, as the machining speed and transmits the same to the board thickness calculation unit 12.

The board thickness calculation unit 12 calculates the board thickness from the machining energy and the machining speed, based on the expression 2 (step S3).

Here, the integer of the expression 2 is a proportional coefficient of a machining volume and the machining energy and is calculated beforehand by a following procedure.

First, since the machining allowance value is constant by the machining servo, the machining is performed at the appropriate condition and the machining allowance value is measured from the machining size.

Then, the workpiece of a flat plate whose board thickness is known is machined at the same condition as the condition in measuring the machining allowance value. At this time, when the machining energy and the machining speed are calculated and the machining allowance value, which has been measured in advance, is used, the values except for the integer of the expression 2 are known and the integer can be thus calculated from a following expression.

Integer=(Board thickness×Machining feed rate×Machining allowance value)/Machining energy    [Expression 3]

The calculated board thickness is transmitted to the machining condition switching unit 11. The machining condition switching unit 11 determines whether to switch the machining condition depending on the board thickness (step S4). It is determined whether to switch the machining condition depending on whether a board thickness different from the previous calculated board thickness is calculated.

When it is determined that the machining condition is to be switched, the process proceeds to step S5. Otherwise, the machining is continuously performed and the process returns to step S3 in which a board thickness is calculated.

During the machining, while the board thickness is calculated, the stationary state determination unit 16 determines whether the machining servo is in the stationary state.

The stationary state index calculation unit 18 calculates a stationary state index by the procedure described by using FIG. 3 from the machining state amount measured by the machining state amount measurement unit 19 and transmits the same to the stationary state determination unit 16 (step S5). Here, the machining state amount is any one of the inter-electrode voltage, the discharge pulse, the servo command speed and the machining speed, as described above, and the machining state amount measurement unit may be any one of a voltage sensor, a pulse-number counter and a linear scale.

In addition, a variety of filtering processes are used to calculate the stationary state index.

The threshold value for determining whether the machining servo is in the stationary state is set by the stationary state threshold value setting unit 17 and is transmitted to the stationary state determination unit 16 in real time.

After waiting for the time considering the responsiveness of the stationary state index (step S6), the stationary state determination unit 16 compares the stationary state index, which is calculated by the stationary state index calculation unit 18, with the stationary state threshold value, which is set by the stationary state threshold value setting unit 17, and thus determines whether the machining servo is in the stationary state (step S7).

When the stationary state index is smaller than the stationary state threshold value, it is determined that the machining servo is in the stationary state and the process returns to the board thickness calculation of step S3 without switching to the machining condition corresponding to the calculated board thickness.

Then, the processes of steps S3 to S8 are repeated until the machining ends (step S9).

According to the above configuration, the electric discharge machining apparatus, which performs the efficient machining without the wire breaking by selecting the appropriate machining condition in accordance with the board thickness of the workpiece, can avoid the switching to the inappropriate machining condition due to the false detection of the board thickness when switching the machining condition. By avoiding the switching to the inappropriate machining condition, it is also possible to avoid the wire breaking due to the switching to the machining condition of the energy larger than that of the appropriate machining condition or the deterioration of the precision due to the switching to the inappropriate machining condition.

Second Embodiment

Before explaining operations of a second embodiment, a concept of the invention is first described.

Regarding a problem where an error is caused in the calculated board thickness due to the switching of the machining condition corresponding to the change of the board thickness, and the machining condition is switched to the inappropriate machining condition due to the error in the calculated board thickness, the first embodiment provides the technology of avoiding the inappropriate switching of the machining condition.

However, when the change of the board thickness is great, the difference of the machining energy of the machining condition switched before and after the change of the board thickness becomes large. Accordingly, it takes time after the machining condition is switched until the stationary state determination unit 16 determines that the machining servo is in the stationary state.

Regarding this, according to this embodiment, when the machining condition is switched between machining conditions having a large difference in the machining energies, the servo command voltage, the off-time control or the peak value of the electric discharge current, which are machining conditions, are gradually switched to suppress a time, which is required to determine that the machining servo is in the stationary state, to a minimum.

Next, the operations of the second embodiment are described with reference to FIG. 5.

Figure 5:
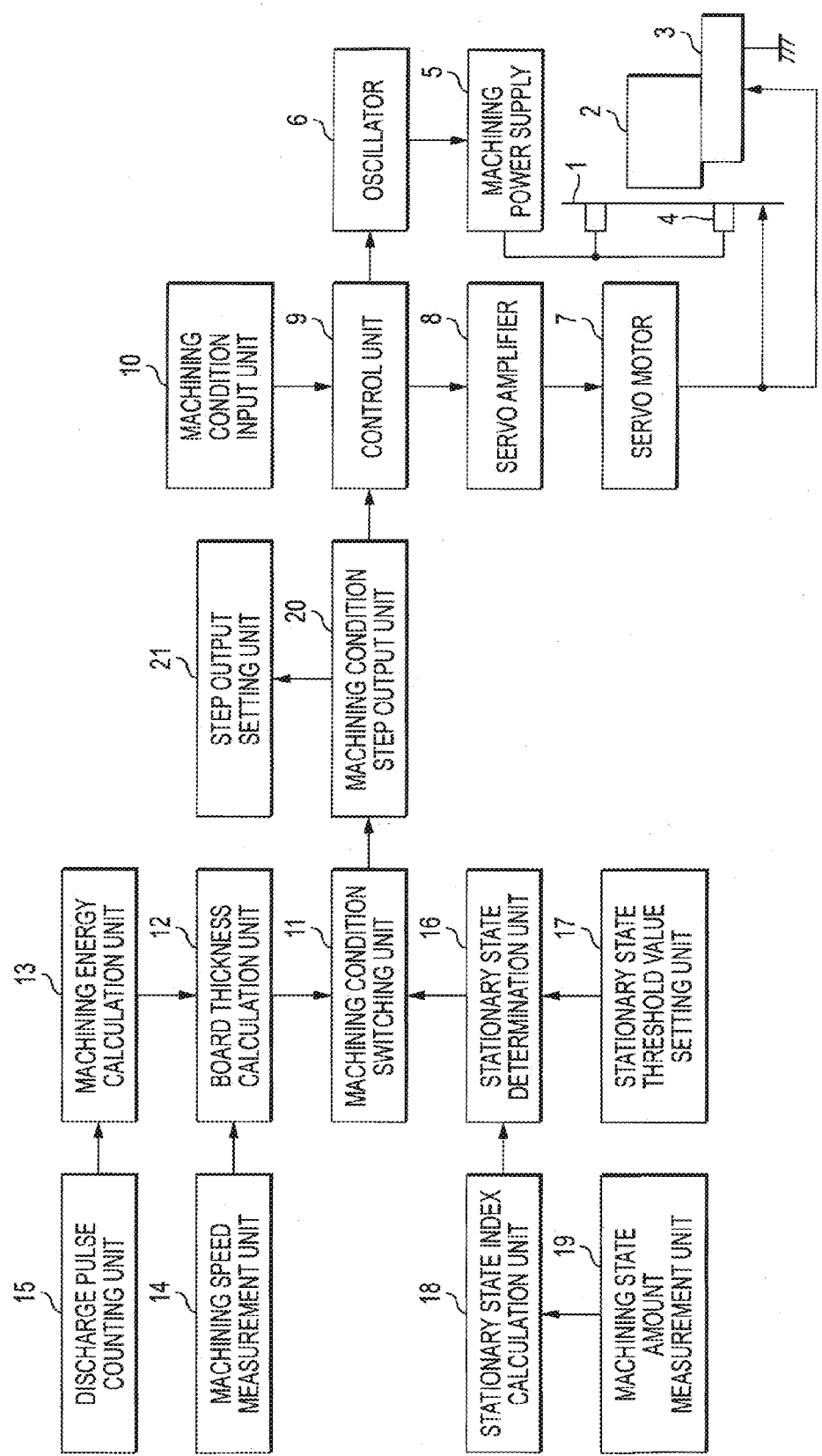
FIG. 5 is a block diagram showing a configuration of a wire electric discharge machining apparatus according to a second embodiment.

FIG. 5 is a block diagram showing an overall wire electric discharge machining apparatus that is described in the first embodiment of the invention, which further has a machining condition step output unit 20 and a step output setting unit 21.

In general, in the wire electric discharge machining apparatus, the electric machining condition is set with a notch and a user sets a step output interval and step output time of the machining condition notch, which are step output setting values, to the step output setting unit 21.

Here, a step output interval of a machining condition notch is set beforehand so that the time period within which the machining servo becomes the transient state is shortened, while a user or maker is checking the stationary state index value during the machining.

Also, when the step output time is too short, a machining condition changing output value, which is determined by a next machining condition notch, is output before the stationary state index is changed, so that the stepwise output becomes meaningless.

Accordingly, the user or maker examines the time that is consumed from when the machining condition notch is output at the step output interval until the stationary state index value becomes stable, and then sets the step output time.

Accompanied by the change of the board thickness, when the machining condition switching unit 11 performs the machining condition switching output having a notch larger than the step output interval of the machining condition notch set by the step output setting unit 21, the machining condition step output unit 20 outputs a condition command to the control unit 9 for each step output interval notch set by the step output setting unit 21 and for every step output time set by the step output setting unit 21.

Then, when the switching of the notch output by the machining condition switching unit 11 ends, the machining condition switching unit 11 again switches the machining condition in accordance with the calculated board thickness and the determination result of the stationary state, as described in the first embodiment.

According to the above configuration, even when the machining condition is switched between machining conditions having a large difference in the machining energies, it is possible to suppress the time, which is consumed from when the machining conditions are switched until the machining servo becomes the stationary state, to a minimum.

INDUSTRIAL APPLICABILITY

The invention can be applied to a power supply control technology of a wire electric discharge machining apparatus that cuts a workpiece in which a board thickness changes.

DESCRIPTION OF REFERENCE NUMERAL

1: wire electrode
2: workpiece
6: oscillator
9: control unit
10: machining conditions input unit
11: machining conditions switching unit
12: board thickness calculation unit
13: machining energy calculation unit
14: machining speed measurement unit
15: discharge pulse counting unit
16: stationary state determination unit
17: stationary state threshold value setting unit
18: stationary state index calculation unit
19: machining state amount measurement unit
20: machining conditions step output unit
21: step output setting unit

The invention claimed is:
1. A wire electric discharge machining apparatus that performs an electric discharge machining to a workpiece by applying a pulse voltage between a wire electrode and the workpiece, thereby generating a discharge pulse, in accordance with a first machining condition which is set, the wire electric discharge machining apparatus comprising:

a machining speed detection unit configured to detect relative machining speed of the workpiece and the wire electrode;

a machining energy calculation unit configured to calculate machining energy of the discharge pulse;

a board thickness calculation unit configured to calculate a board thickness of the workpiece based on the machining speed detected by the machining speed detection unit and the machining energy calculated by the machining energy calculation unit;

a stationary state determination unit configured to determine whether the machining is in a stationary state during the machining, after determining that the first machining condition is to be switched in accordance with the board thickness of the workpiece calculated by the board thickness calculation unit; and a machining condition switching unit configured to switch the first machining condition to a second machining condition corresponding to the board thickness calculated by the board thickness calculation unit based on the stationary state determination unit determining that the machining is in the stationary state and configured to not switch the first machining condition to the second machining condition corresponding to the calculated board thickness based on the stationary state determination unit determining that the machining is not in the stationary state.

2. The wire electric discharge apparatus according to claim 1, wherein, the stationary state determination unit is configured to determine whether the machining is in the stationary state by comparing a stationary state index, which is obtained by detecting and filtering an inter-electrode voltage during the machining, with a predetermined threshold value.

3. The wire electric discharge apparatus according to claim 1, wherein, the stationary state determination unit is configured to determine whether the machining is in the stationary state by comparing a stationary state index, which is obtained from a variation of the number of discharge pulses, with a predetermined threshold value.

4. The wire electric discharge apparatus according to claim 1, wherein, the stationary state determination unit is configured to determine whether the machining is in the stationary state by comparing a stationary state index, which is obtained from a variation of the machining speed, with a predetermined threshold value.

5. The wire electric discharge apparatus according to claim 1, wherein, the stationary state determination unit is configured to determine whether the machining is in the stationary state by comparing a stationary state index, which is obtained from either a servo command speed or a travel distance, with a predetermined threshold value.

6. The wire electric discharge apparatus according to claim 1, wherein, the stationary state determination unit is configured to wait for a time period considering a response of a stationary state index after determining that the first machining condition is to be switched in accordance with the calculated board thickness, and configured to perform a comparison of the stationary state index with a predetermined index after the time period passes.

7. The wire electric discharge apparatus according to claim 1, wherein, when the machining condition switching unit switches the first machining condition in accordance with the board thickness of the workpiece calculated by the board thickness calculation unit, the first machining condition is gradually switched in accordance with a preset step output interval of a machining condition notch and a step output time.

8. The wire electric discharge apparatus according to claim 7, wherein, a servo command voltage is gradually switched, as the first machining condition.

9. The wire electric discharge apparatus according to claim 7, wherein, a length of off-time is gradually switched, as the first machining condition.

10. The wire electric discharge apparatus according to claim 7, wherein, a peak value of electric discharge current is gradually switched, as the first machining condition.

11. The wire electric discharge apparatus according to claim 1, further comprising:

a controller configured to determine whether to switch the first machining condition based on the calculated board thickness of the workpiece, and the stationary state determination unit is configured to determine whether the machining is in the stationary state during the machining, in response to the controller determining that the first machining condition is to be switched.

* * * * *